United States Patent [19]
Casey et al.

[11] 3,864,246
[45] Feb. 4, 1975

[54] NON-BULKING ACTIVATED SLUDGE PROCESS

[75] Inventors: Jeremiah P. Casey; Curtis S. McDowell, both of Macungie, Pa.; Marshall L. Spector, Belle Mead, N.J.; Alan J. Zupko, Malvern, Pa.

[73] Assignee: Air Products and Chemicals, Inc., Allentown, Pa.

[22] Filed: Jan. 24, 1973

[21] Appl. No.: 326,377

[52] U.S. Cl.................................... 210/7, 210/15
[51] Int. Cl............................................ C02c 1/06
[58] Field of Search.............. 210/5, 7, 15, 4, 6, 8, 210/11, 12, 16, 17, 14

[56] References Cited
UNITED STATES PATENTS

| | | | |
|---|---|---|---|
| 3,547,813 | 12/1970 | Robinson et al. | 210/7 |
| 3,547,814 | 12/1970 | McWhirter | 210/7 |
| 3,547,815 | 12/1970 | McWhirter | 210/7 |
| 3,725,258 | 4/1973 | Spector et al. | 210/7 |
| 3,764,524 | 10/1973 | Stankewich | 210/5 |

*Primary Examiner*—Thomas G. Wyse
*Attorney, Agent, or Firm*—Bernard M. Weiss; Barry Moyerman

[57] ABSTRACT

A liquid stage, or its hydraulic equivalent, is maintained in an activated sludge system where incoming waste water and recycle sludge are initially mixed. Both the dissolved oxygen and the steady state BOD are maintained at or above minimal concentrations critical to promote the selective growth of active, rapidly settling, non-filamentous biomass thereby inhibiting or precluding the development of filamentous biomass of higher surface area.

5 Claims, 1 Drawing Figure

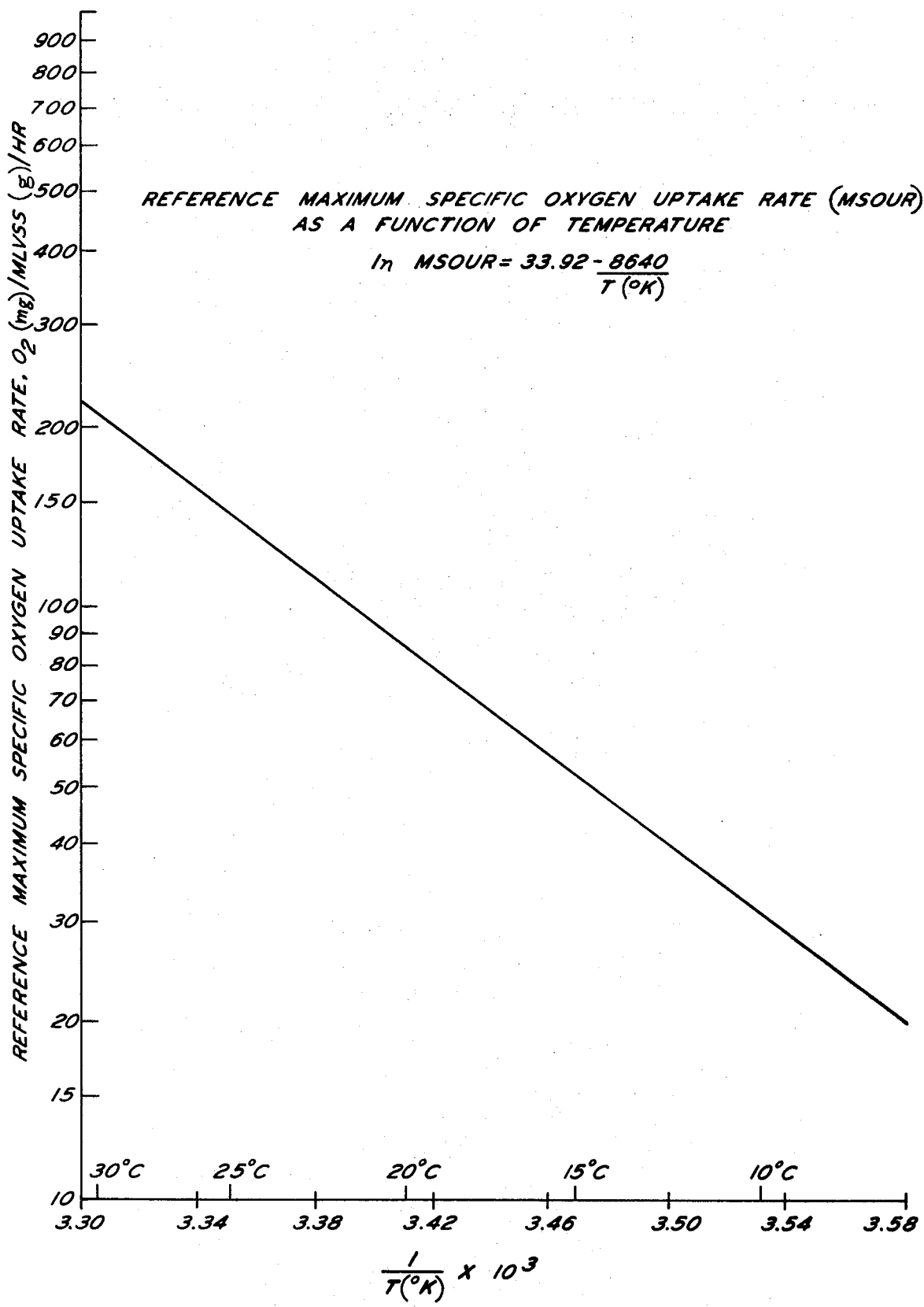

NON-BULKING ACTIVATED SLUDGE PROCESS

BACKGROUND OF THE INVENTION

1. Field of the Invention

This invention relates generally to improvements in the treatment of municipal sewage and/or industrial waste water by the activated sludge process. It is particularly concerned with control of operating conditions to enhance the selective production and maintenance in the system of a highly active biomass essentially free from filamentous growth, whereby the obtained sludge has favorable settling characteristics.

2. Prior Art

The activated sludge process has been used for many years for the removal of biological oxygen demand, BOD, from waste water. This process consists of maintaining an aeration basin in which waste water is fed to a suspension of microorganisms to form a mixed liquor. The mixed liquor is aerated to furnish oxygen for the respiration of the biomass, which sorbs, assimilates, and metabolizes the biological oxygen demand of the waste water.

After a suitable period of aeration, the mixed liquor is introduced to a clarifier in which the biomass settles and the treated waste water overflows into the receiving stream. A major portion of the settled biomass, which is concentrated at the bottom of the clarifier, is recycled to the aeration basin and a minor portion is purged in order to maintain a constant biosolids inventory within the system. This process has been extensively described in the literature and several of its modifications summarized in a special report on "Waste Water Treatment" by R. H. Marks contained in the June 1967 issue of POWER.

Despite the versatility and effectiveness of this process and its many modifications, there remains a major problem. It is the proliferation of high surface area and/or filamentous species, such as *Sphaerotilus*, which do not settle adequately in the clarifier. Thus one consequence of filamentous biomass is the inability to disengage the biomass from the treated waste water. Another is the inability to concentrate the biomass adequately at the bottom zone of the clarifier, thus necessitating a high recycle volume from the clarifier relative to the volume of influent waste water flow, in order to maintain an adequate concentration of biomass or mixed liquor volatile suspended solids (MLVSS) in the aeration basin. This results in the need for large aeration basins and high capacity sludge recycle pumps and lines.

Once established, filamentous microorganisms are difficult to displace short of drastic action, which is generally harmful to the total biomass. In any case, activated sludge treatment plants usually experience periods of prolonged unsatisfactory performance when this "bulking" occurs.

Several modifications of the basic activated sludge process have been proposed in an attempt to avoid or overcome this deficiency. One method is to distribute the influent waste water to different sections of the aeration basin in order to spread out the oxygen demand. Another is to decrease the loading of BOD to the aeration basin. A third method is to add poisons to the system in order to selectively kill off the high surface area filaments. Still another method is to make the system anaerobic and thus kill the filamentous biomass which is composed largely of obligate aerobes.

None of the above methods is satisfactory in that they do not preclude the problem of filamentous "bulking."

It is therefore among the objects of the present invention to provide a process which avoids proliferation of filamentous biomass by promoting the growth of more desirable species. In addition, the process of the invention produces an active, dense biomass, which requires minimal oxygen to remove BOD.

SUMMARY OF THE INVENTION

It has now been found that the desired selective production of a non-filamentous biomass population of highly active dense and rapidly settling microorganisms can be promoted and sustained by maintaining controlled conditions during the initial stage of aeration of the aqueous waste in an activated sludge system, whereby the growth and proliferation of undesired higher surface area microorganisms having poor settling characteristics is minimized. This is accomplished in accordance with the invention, by providing at the region where waste water is admitted to an aeration basin a separate initial liquid treating stage, or its hydraulic equivalent, as determined by the residence time distribution via tracer experiments (see Levenspiel, "Chemical Reaction Engineering," John Wiley & Sons, N. Y. 1962, pp. 242–308) and maintaining therein a sufficiently high level of soluble BOD and an adequate content of dissolved oxygen. Thereafter the BOD-containing liquid from this initial treating stage without intermediate clarification is subjected to further aeration in one or more stages to assimilate and oxidize the BOD largely sorbed in or on the biomass.

DESCRIPTION OF THE PREFERRED EMBODIMENTS

An initial liquid treating stage is where BOD in influent waste water is distributed to a mixed culture of biomass. The present invention provides for an initial liquid stage in which critical conditions of high dissolved oxygen and high concentrations of BOD are maintained. The latter is achieved by maintaining a high food to biomass loading, F/M, throughout this initial treating zone. The microorganisms which compose filamentous biomass, having a relatively high surface area, are thus deprived of the conditions which make them most favored to proliferate because of their large surface area, relative to that of more desirable species.

Conditions which favor the production of undesired filamentous, high surface area biomass are:

1. An abundance of soluble BOD in the presence of low levels of dissolved oxygen.
2. An abundance of dissolved oxygen in the presence of low levels of BOD.
3. Low levels of BOD and low levels of dissolved oxygen.

Conversely, conditions which maintain both an abundance of soluble BOD and an abundance of dissolved oxygen favor those microorganisms which can assimilate and oxidize BOD rapidly and consequently grow more rapidly. In addition to having high assimilative and oxidation rates, these microorganisms are characterized by having a low sludge volume index (Mohlmann) and high zone settling velocity (ZSV).

The species which assimilate and oxidize BOD most effectively will eventually dominate the biomass population. Thus the method of this invention promotes the development of desirable active species to the competitive disadvantage of undesired filamentous species.

It is well recognized ("Advances in Bio. Waste Treatment," p. 299, Eckenfelder & McCabe, MacMillan, 1963) that the major portion of BOD is removed from mixed liquor within the first 5 to 20 minutes contact time. Therefore, the allocation of food energy, coupled with an adequate supply of dissolved oxygen in these critical 5 to 20 minutes, determines which species will dominate the mixed culture. The population dynamics are largely established in this initial zone. Therefore, the conditions maintained in this zone are critical to determining properties of the activated sludge.

Further aeration after this initial contact is necessary to complete oxidation and assimilation of the soluble BOD, which must necessarily be maintained at a high level in this initial stage according to the invention. The need to provide adequate liquid-solids mixing and certain levels of dissolved oxygen to operate activated sludge systems effectively has been well recognized in the literature. It has been suggested (POWER, op. cit., page S-7) that the maintenance of at least 0.5 ppm of dissolved oxygen is necessary to avoid anaerobic metabolism within a flocculant biomass. These conditions are also required in downstream aeration after the initial liquid stage of the present invention.

The necessity to maintain a minimal dissolved oxygen level as a function of the loading to an initial mixing zone to avoid the onset of filamentous growth has not heretofore been recognized. The need to maintain simultaneously a high BOD, or food concentration in the presence of an abundance of dissolved oxygen in an initial liquid stage in order to achieve good sludge properties, also has not heretofore been realized.

The BOD concentration in the mixed liquor within an aeration basin cannot be accurately described by the BOD concentration in the clear liquor alone, because the true concentration in the mixed liquor must include the BOD sorbed on and within the cell walls of microorganisms as well as that free in solution. It has been found possible to describe the minimal BOD concentration necessary to avoid growth of filamentous and/or other high surface area organisms in an initial mixed liquor phase, in terms of pounds of BOD fed per day per pound of biomass under aeration in this first mixed liquor stage, being a modified form of the F/M expression heretofore known, but wherein both the terms F and M are defined as discussed below.

We have found that the pounds of total soluble BOD fed per day is a useful measure of F. This is in distinct contrast to the use of $BOD_5$, which is most commoly used, but which includes both soluble and insoluble BOD matter. Only soluble BOD is used in defining the process conditions employed in this invention because the holding time in this initial mixed liquor zone is too brief to allow much, if any, of the insoluble BOD to solubilize and thus participate in the food energy allocation in this zone. Soluble $BOD_5$ does not fully measure the total soluble BOD. Soluble $BOD_{20}$ is a better measure, but determination of this value is too time consuming for practical application. It is reported in the POWER reference that essentially complete biological oxidation of organic matter takes about 20 days and the standard five-day, $BOD_5$, equals about two-thirds of the total BOD. Therefore, an acceptable approximation for total soluble BOD may be calculated by multiplying the soluble $BOD_5$ by a factor of 1.5. The pounds of soluble $BOD_5$ fed per day and multiplied by a factor of 1.5 is used to define $F_s$ in the present specification and claims. To determine soluble BOD, the soluble matter is separated from insolubles by filtration through a 5 micron filter.

The term M is usually defined as the pounds of mixed liquor volatile suspended solids (MLVSS) under aeration in a given volume of mixed liquor. The MLVSS concentration in mixed liquor is determined by standard methods. In the present disclosure the term $M_a$ is used to define the pounds of MLVSS under aeration in a given volume multiplied by an activity coefficient, $\alpha$. The term $M_a$ thus describes the activity of MLVSS acclimated to any specific waste water. The activity coefficient, $\alpha$, is determined by measuring the maximum specific oxygen uptake rate, expressed as milligrams of oxygen per gram of MLVSS per hour, and then dividing this observed rate by a reference rate expressed in the same terms, displayed as a function of temperature in the FIGURE of the accompanying drawing.

The maximum specific oxygen uptake rate is experimentally determined by increasing the BOD loading to an acclimated biomass in the presence of abundant dissolved oxygen until the specific uptake rate no longer increases with increased loading. The method of determining the oxygen uptake rate is described in the literature by many authors. The one described in "Dynamic Measurement of the Volumetric Oxygen Transfer Coefficient in Fermentation Systems" by B. Bandyopadhyay and A. E. Humphrey published in *Biotechnology and Bioengineering*, Vol. IX, pages 533–544 (1967), is typical. The experimentally observed maximum specific oxygen uptake rate is divided by the reference maximum specific uptake rate indicated at the corresponding temperature in the FIGURE to arrive at the activity coefficient, $\alpha$, which is a dimensionless number.

The activity coefficient also is an indicator of change of activity as a function of change in operating conditions. This will be illustrated in examples cited below. Unless otherwise noted, all food to biomass values cited below and in the claims of this patent application are in terms of $F_s$ and $M_a$ as described above, wherein $F_s$ indicates 1.5 times the weight of soluble $BOD_5$ fed per day and $M_a$ represents the active portion of the biomass obtained by multiplying the weight of MLVSS by the activity coefficient $\alpha$ determined as above described. When the teachings of this invention are followed and toxic chemicals are not present to a significant degree, the activity coefficient, $\alpha$, will approach unity and $M_a$ will be approximately equal to M.

The process of this invention concentrates on the importance of maintaining prescribed conditions in an initial zone of aerating mixed liquor, which are critical to obtain superior sludge properties. In practice of the present invention at least one additional stage of oxidation in the aeration basin will be necessary to complete oxidation plus assimilation of the BOD values remaining in solution and/or sorbed in the initial stage. The utilization of at least one additional aeration stage thus distinguishes this modification from activated sludge systems employing a single aeration zone, as in "contact stabilization" or "complete mix" systems.

It is during this further oxidation that sorbed particulate BOD is slowly hydrolyzed to produce soluble BOD. The oxygen demand response to the BOD solubilized in this manner is low in comparison to that required in the initial liquid treating stage in which the influent waste is contacted with recycle sludge, and usually can be characterized as a pseudoendogenous respiration rate. By following the principles of this invention, attainment of the onset of an endogenous respiration rate may be achieved within a (raw influent only) aeration residence time of less than two hours. However, to achieve this condition an appropriate concentration of active MLVSS must be used. When endogenous respiration is approached or attained, assimilation of BOD has been sufficiently completed in the aeration basin, at which time the mixed liquor may be introduced to the clarifier.

A guide to selecting the proper concentration of active MLVSS to treat various levels of soluble BOD concentrations of waste water within a raw influent only residence time not exceeding two hours, is presented by way of example in Table 1. This table lists residence time in an initial mixed liquor stage as a function of the $F_s/M_a$ ratio maintained in this stage. The ranges of these variables cited in this table are for the purpose of estimating the level of MLVSS to be selected for treating a given strength waste water, rather than for limiting the scope of this invention.

With reference to Table 1, an MLVSS level which requires a raw influent residence time in the initial zone of less than 0.3 hours will, in general, attain a state of actual or pseudo endogenous respiration within two hours nominal residence time. Longer residence times at lower MLVSS are also within the scope of this invention. The values cited in this table may be interpolated or extrapolated to other values of soluble BOD and active MLVSS without departing from the scope of this invention.

In the practice of the present invention the initial liquid stage may be subdivided into smaller distinct zones. The minimal residence time in an initial liquid mixing stage should be interpreted to include a multiplicity of smaller zones, providing that the $F_s/M_a$ of the mixed liquor contained in all such zones falls within the defined limits. If desired, an initial mixed liquor zone may be provided at each location within an aeration basin at which influent waste water is initially introduced.

The present invention is illustrated by the following non-limiting examples.

EXAMPLE I

An Abundance of BOD in the Presence of Low Levels of Dissolved Oxygen

An activated sludge system was established in which an uncorrected MLVSS level of about 3,000 ppm was acclimated to a waste water which was treated in a five-stage aeration basin. The first and second mixed liquor stages were each four liters and the last three mixed liquor stages were each eight liters in volume.

The operating conditions selected for each run are shown in Table 2 and the sludge characteristics are shown in Table 3. Table 3 also shows four soluble food to biomass ratios (F/M). The ratio concerned in this application is the $F_s/M_a$ in the first basin. The other values are displayed to highlight the difference between the food to mass ratio $F_s/M_a$ employed in defining the practice of this invention and alternate modes of expressing food to biomass ratios.

TABLE 1

RAW INFLUENT RESIDENCE TIME* (in hours) in INITIAL LIQUID STAGE as a FUNCTION OF $F_s/M_a$ in INITIAL STAGE, SOLUBLE BOD CONCENTRATION and CONCENTRATION OF ACTIVE MLVSS

| 1.5 × SOLUBLE BOD$_5$ (ppm) | 100 | | | 200 | | | 300 | | | 400 | | |
|---|---|---|---|---|---|---|---|---|---|---|---|---|
| $F_s/M_a$ 1st Stage | 3.8 | 5.7 | 7.6 | 3.8 | 5.7 | 7.6 | 3.8 | 5.7 | 7.6 | 3.8 | 5.7 | 7.6 |
| MLVSS at Standard Activity** (ppm) | | | | | | | | | | | | |
| 1000 | .63 | .42 | .32 | 1.25 | .84 | .63 | 1.89 | 1.42 | .95 | 2.52 | 1.80 | 1.26 |
| 2000 | .32 | .21 | .16 | .63 | .42 | .32 | .95 | .71 | .47 | 1.26 | .84 | .63 |
| 3000 | .21 | .14 | .10 | .42 | .28 | .21 | .63 | .47 | .32 | .84 | .56 | .42 |
| 4000 | .16 | .11 | .08 | .32 | .21 | .16 | .47 | .32 | .24 | .63 | .42 | .32 |
| 5000 | .13 | .08 | .06 | .25 | .17 | .13 | .38 | .28 | .19 | .50 | .33 | .25 |

*Time values in Table are based on zero sludge recycle. In order to obtain the nominal residence time for any volumetric sludge recycle rate, R, the values in this Table must be multiplied by the ratio Q/Q+R, where Q is the volumetric influent waste water flow rate.
**As defined in FIG. 1.

TABLE 2

OPERATING CONDITIONS

| Run No. | MLVSS ppm | Nominal Residence Time (hrs.) | 1.5 × Soluble BOD$_5$ Fed Conc. ppm | Grams per Day | % BOD$_5$ Removed Filtered Effluent Basis | Temp. °C | Sludge Recycle Vol.% of Influent |
|---|---|---|---|---|---|---|---|
| 1 | 3200 | 2.29 | 312 | 96 | 96 | 19.3 | 8.3 |
| 2 | 3300 | 2.18 | 295 | 81 | 94 | 20.2 | 15.9 |
| 3 | 3100 | 2.40 | 319 | 93 | 98 | 19.9 | 9.4 |
| 4 | 3200 | 2.37 | 297 | 88 | 98 | 19.9 | 10.8 |
| 5 | 3500 | 2.30 | 650 | 198 | 84 | 20.0 | 9.5 |
| 6 | 2900 | 2.19 | 370 | 118 | 96 | 20.0 | 8.6 |
| 7 | 3000 | 2.10 | 310 | 100 | 95 | 20.0 | 12.1 |

TABLE 3

SLUDGE CHARACTERISTICS AS A FUNCTION OF DISSOLVED OXYGEN LEVEL

| Run No. | Dissolved Oxygen Level, ppm in each stage in order of stage no. | Filamentous Growth | SVI, Mohlman Index | $F_s/M$ (M is Uncorrected for $\alpha$) Overall | $F_s/M$ 1st Basin | $F_s/M_a$ (Ma is Adjusted for $\alpha$) Overall | $F_s/M_a$ 1st Basin | Max.Activity of Biomass $MgO_2$/g/hr MLVSS | Activity Coefficient $\alpha$ | Run Duration, Days |
|---|---|---|---|---|---|---|---|---|---|---|
| 1 | 10,10,10,10,10 | No | 40 | 0.92 | 7.4 | 1.1 | 8.7 | 68 | 0.80 | 25 |
| 2 | 10,10,2,2,2 | No | 40 | 0.78 | 6.2 | 1.2 | 9.4 | 62 | 0.66 | 29 |
| 3 | 5,5,5,5,5 | No | 40 | 0.93 | 7.5 | 1.9 | 15 | 46 | 0.50 | 18 |
| 4 | 2,2,2,2,2 | No | 55 | 0.87 | 6.9 | 2.0 | 16 | 40 | 0.43 | 31 |
| *5 | 2,2,2,2,2 | Incipient | 60 | 1.8 | 14 | 5.3 | 41 | 30 | 0.34 | 8 |
| **6 | 2,2,2,2,2 | Yes | 175 | 1.3 | 10 | 3.4 | 26 | 33 | 0.38 | 8 |
| 7 | 10,10,2,2,2 | Yes | 250 | 1.0 | 7.4 | 1.9 | 14 | 45 | 0.52 | 23 |

*Influent $BOD_5$ Increased from 198 to 433 ppm
**Return to normal $BOD_5$ Load (198 ppm)

The activity coefficient of the MLVSS listed in Table 3 is obtained by dividing the maximum specific oxygen uptake rate reported in Table 3 by the value for the reference specific oxygen uptake rate at the corresponding temperature according to the graph in FIG. 1. Thus, for 20°C the reference is 87 mg. oxygen per gram of MLVSS per hour.

Referring to Table 3, it may be seen that the activity coefficient is reduced as the dissolved oxygen level is lowered and increased as the dissolved oxygen level is increased. The prime point of this example is to note that an increase in the Mohlmann sludge volume index (SVI) and onset of proliferation of filamentous biomass was triggered by operating at a dissolved oxygen level of 2 ppm when the $F_s/M_a$ to the initial basin was 41 (Run No. 5); however, a dissolved oxygen level of 2 ppm did not promote filamentous growth when the $F_s/M_a$ to the initial basin was 16 (Run No. 4). In other words, the DO content in Run No. 5 was insufficient to satisfy the oxygen requirements at the high $F_s/M_a$ level to avoid the onset of filamentous microorganism growth. For this high $F_s/M_a$ ratio (about 40) a dissolved oxygen level of about 4 ppm is the minimal required in the initial treating stage. As a practical guide, the minimum DO level (in parts per million) to be maintained in the initial liquid stage should be no less numerically than 0.1 times the $F_s/M_a$ ratio in that stage. A DO level of at least 2 ppm is advocated at even low $F_s/M_a$ ratios to safeguard against possible sudden upset in the system that might otherwise prove difficult or impossible to correct. Operation at $F_s/M_a$ ratios in the initial basin greater than 40 with dissolved oxygen values of greater than 4 ppm are not precluded in the practice of the principles of the present invention.

Referring again to Table 3, it may be seen that the activity coefficient increased upon lessening the $F_s/M_a$ ratio in Run 6 and even more so upon increasing the dissolved oxygen level in Run 7, but the infestation of filamentous biomass continued to exist over the additional period of over one month, during which these runs were conducted.

This difficulty in correcting the situation illustrates the importance of maintaining conditions at the outset which preclude significant infestation of filamentous growth. Run 7 was not continued for a sufficient length of time to provide for recovery of desired sludge properties, although the increased activity coefficient obtained is indicative that recovery would ultimately be achieved. Such complete recovery of desired sludge properties has been observed in other studies made in practice of this invention.

EXAMPLE II

An Abundance of Dissolved Oxygen in the Presence of Low Levels of BOD - Nitrifying System Two activated sludge units were established. They were duplicate units operated in identical fashion. The liquid staging for each was arranged to contain five stages. The first four stages were each one-sixth and the fifth stage was one-third of the total volume (1/6, 1/6, 1/6, 1/6, ⅓). The MLVSS was maintained at about 2,500 ppm and the activity coefficient at 20°C was 0.8 for both systems. The overall $F_s/M_a$, exclusive of ammonia oxidation demand, was about 0.85 and the $F_s/M_a$ in the initial liquid stage was about 5.2.

Both systems were operating at 20°C in a mode which effected over 90% removal of $BOD_5$ (soluble plus insoluble) and over 90% oxidation or assimilation of ammonia values. The soluble $BOD_5$ was introduced at about 190 ppm and the ammonia at about 50 ppm. The oxygen level in the initial stages of both units was maintained at 10 ppm, a level high enough to insure an overabundance of dissolved oxygen.

In order to demonstrate the effect of changing $F_s/M_a$ in the initial liquid stage while maintaining the overall $F_s/M_a$ constant, the two units were modified in that the first unit was altered to contain approximately one-twelfth of the total volume in the initial stage, one-fourth of the total volume in the second stage and the balance as before (1/12, 3/12, 2/12, 2/12, 4/12). The second unit was modified to contain one-third of the total volume in the first stage and the last three stages were maintained as before (2/6, 1/6, 1/6, 2/6). The immediate effect of this arrangement was to increase the $F_s/M_a$ to the first stage of the first unit to about 10 and to decrease the $F_s/M_a$ to the first stage of the second unit to about 2 ½. The overall $F_s/M_a$ was unaltered at 0.85 for both systems.

The first unit, with the increased $F_s/M_a$ in the initial stage, performed as before with no significant change in either sludge volume index or zone settling velocity, which had been and still remained at about 90 SVI and 5 to 10 feet per hour ZSV, respectively. The activity coefficient increased to 1.3.

The second unit with the decreased $F_s/M_a$ in the initial stage developed a poorly settling biomass population within five days. The SVI increased to over 200 and the ZSV decreased to less than 2 ½ feet per hour. The SVI increased to over 300 on the sixth day. The activity coefficient decreased to 0.7.

This example demonstrates that an activated sludge system can oxidize ammonia and remove BOD effectively and at the same time produce a rapidly settling, dense sludge if the $F_s/M_a$ to an initial aeration zone is as high as five. Conversely at an $F_s/M_a$ of 2 ½ to an initial aeration zone, despite sufficiently high level of DO, sludge properties become unacceptable. This example illustrates the criticality of $F_s/M_a$ in an initial liquid stage, as contrasted with the $F_s/M_a$ ratio in the entire aeration basin.

EXAMPLE III

An Abundance of Dissolved Oxygen in the Presence of Low Levels of Soluble BOD-Non-Nitrifying System at 14°C A series of runs were made in which a waste water containing soluble BOD was treated in an activated sludge system at a nominal residence time of 1.6 hours (total flow) at about 14°C. The dissolved oxygen level was maintained at about 10 ppm in all stages of all runs. The MLVSS was maintained constant at about 3,000 ppm and the overall $F_s/M_a$ was maintained at from 1.4 to 2.0. The $F_s/M_a$ in the initial stage was decreased by changing the total number of equal liquid stages from 10 to 5 to 2 and finally to 1. The net effect was to decrease the $F_s/M_a$ in the initial stage from 14 to 8.3 to 3.8 to 2.3. The nominal residence time in the initial mixing zone was increased at the same time from 0.16 to 0.32 to 0.81 to 1.6 hours.

increased oxygen utilization, upon decreasing the $F_s/M_a$ in the initial stage from 14 to 2.3, was from 0.58 grams oxygen per gram of $BOD_5$ removed to 0.70 grams of oxygen per gram of $BOD_5$ removed, respectively. This 20% increase in oxygen requirement is unexpected and represents a significant penalty in terms of oxygen transfer energy for the single stage system.

The main advantage in operating with high $F_s/M_a$ in the initial zone in these systems is evidenced by the superior sludge properties and avoidance of filamentous or other poor settling growth. In runs where the initial $F_s/M_a$ was 8.0 and 15.1, the SVI was in the range of from 50 to 60 and the zone settling velocity was a remarkable 15 feet per hour.

Onset of poorly settling filamentous growth occurred after about 20 days operation with the two stage system, where the $F_s/M_a$ to the initial zone was reduced to 3.8. The adverse effects of the filamentous biomass was evidenced by an increase in SVI from 50 to 90 and a decrease in zone settling velocity from 19 to 6 feet per hour. Thus, the minimum $F_s/M_a$ to an initial zone can be established as slightly greater than 3.8 and 4.0 is considered minimal. At $F_s/M_a$ ratio of 2.3 in single stage operation the sludge properties deteriorated further.

TABLE 4

EFFECTS OF CHANGING LIQUID PHASE STAGING

| | | | | |
|---|---|---|---|---|
| Run Duration (days) | 22 | 28 | 25 | 14 |
| No. Liquid Stages | 10 | 5 | 2 | 1 |
| MLVSS (mg/l) | 3023 | 3230 | 3002 | 3131 |
| Filtered Influent 1.5×Sol.BOD$_5$(mg/l) | 316 | 358 | 363 | 357 |
| Filtered Effluent (mg/l) | 3.9 | 5.4 | 4.3 | 8.8 |
| Residence Time overall (hrs.) | 1.61 | 1.61 | 1.63 | 1.60 |
| Recycle % Influent | 13.9 | 12.7 | 11.5 | 20.1 |
| $F_s/M_a$ –1st stage | 14 | 8.3 | 3.8 | 2.3 |
| $F_s/M_a$ –overall | 1.38 | 1.7 | 2.0 | 2.3 |
| % BOD$_5$ removed in clarifier | 96 | 95 | 95 | 93 |
| % BOD$_5$ removed at 100% clarifier efficiency | 99 | 98 | 99 | 98 |
| SVI(ml/g TSS) start to finish | 52 to 60 | 51 to 53 | 53 to 90 | 90 to 220 |
| ZSV(ft/hr) start to finish | 15 to 15 | 15 to 19 | 19 to 6 | 6 to 4 |
| O$_2$/BOD$_5$ removed wt/wt | 0.58 | 0.64 | 0.63 | 0.70 |
| VSS sludge in recycle (mg/l) | 24800 | 28200 | 29200 | 18900 |
| Temp. °C | 13.6 | 13.7 | 14.5 | 13.3 |
| Max. O$_2$ uptake mgO$_2$/g MLVSS/hr | 44 | 40 | 41 | 27 |
| Activity Coefficient | 1.0 | 0.91 | 0.84 | 0.63 |

Operating data and sludge characteristics for these conditions are displayed in Table 4. It may be observed that the activity coefficient was 1.0 at the highest $F_s/M_a$ to the initial zone and decreased regularly as the $F_s/M_a$ to the initial stage was lowered.

The grams of oxygen required to effect the removal of one gram of $BOD_5$ increased as the $F_s/M_a$ in the initial mixed liquor stage was decreased. The extent of the

OPERATION WITH MUNICIPAL WASTE WATER

EXAMPLE IV

The summary of an example of operation of this method with municipal waste water is presented in Table 5. The aeration basin of this system was divided into six liquid stages which were ⅛, ⅛, ⅛, ⅛, 2/8 and 2/8 of the total volume.

The system was essentially free of filamentous growth and exhibited excellent sludge settling properties as may be evidenced from the low SVI, high ZSV and low sludge recycle volume. An endogenous oxygen uptake rate of 19 milligrams per gram of MLVSS was attained in 1.34 hours in this example.

TABLE 5

EXAMPLE OF OPERATION WITH MUNICIPAL WASTE WATER

| | |
|---|---|
| MLVSS Aeration Basin (mg/l) | 1715 |
| MLSS Recycle Sludge (mg/l) | 22200 |
| BOD$_5$ Influent, Unfiltered (mg/l) | 120 |
| BOD$_5$ Influent, Filtered (mg/l) | 64 |
| Total Suspended Solids in Influent (mg/l) | 153 |
| Nominal Residence Time in Aeration Basin (hours) | 1.34 |
| Nominal Residence Time in Initial Liquid Stage (hours) | 0.17 |
| Recycle Volume, % of Influent Flow | 8.9 |
| F$_s$/M$_a$, Initial Liquid Stage | 4.6 |
| F$_s$/M$_a$, Total Aeration Basin | 0.57 |
| BOD$_5$ Effluent, Unfiltered (mg/l) | 22 |
| BOD$_5$ Effluent, Filtered (mg/l) | 8.5 |
| % BOD$_5$ Removed, Unfiltered In-Filtered Out | 93 |
| Temperature, °C | 19.5 |
| Maximum Oxygen Uptake Rate, mg Oxygen/g MLVSS/hr. | 75 |
| Activity Coefficient ($\alpha$) | 0.9 |
| Oxygen Consumed/1.5 BOD$_5$ Soluble Removed, wt/wt | 1.0 |
| Oxygen Consumed/BOD$_5$ Total Removed, wt/wt | 0.8 |
| SVI (ml/g MLVSS) | 45 |
| ZSV (ft/hr) | 21 |

Practice of the invention does not require any special means for incorporation of oxygen into the mixed liquor comprising the BOD-containing aqueous waste and recycled activated sludge. Thus, one may employ the conventional means for introducing the oxygen-containing gas and admixing the same with the liquid, such as by diffusers or spargers below the liquid level with or without auxiliary mechanical circulating and agitating means, or by the use of surface aerators. Where the oxygen uptake rate in a treating zone exceeds the capacity to transfer oxygen by use of atmospheric air, the air may be supplemented or enriched by pure oxygen. For example, to satisfy the oxygen demand of a mixed liquor having a total oxygen uptake rate in excess of 100 mg/1/hr, the use of an oxygen-enriched aeration gas (in excess of 21% O$_2$ by volume) is recommended.

We claim:

1. In the operation of an activated sludge system having at least two successive aeration stages, the method of inhibiting proliferation of filamentous biomass which comprises: aerating in an initial stage a mixed liquor comprising BOD-containing aqueous waste in admixture with activated sludge while controlling at least one variable selected from the group consisting of initial stage influent residence time, activated sludge recycle rate, and initial stage MLVSS concentration such that the ratio of soluble food to active biomass as determined by the expression F$_s$/M$_s$ is at least 4 and there is maintained in the mixed liquor during said initial stage a dissolved oxygen content numerically equal in parts per million to at least 2 or one-tenth the numerical value of the ratio F$_s$/M$_a$, whichever is the greater, wherein F$_s$ is equal to 1.5 times the weight of soluble BOD$_5$ charged per day to the mixed liquor and M$_a$ is equal to the quantity of MLVSS in the mixed liquor in said stage multiplied by an activity coefficient determined by the ratio of the maximum specific oxygen uptake rate of the volatile suspended solids (VSS) under aeration to the predetermined reference maximum specific oxygen uptake rate MSOUR for the same temperature, MSOUR being determined by the equation:

$$\ln \text{MSOUR} = 33.92 - 8640/T(°K).$$

2. The method in accordance with claim 1 wherein the mixed liquor is one having an oxygen demand characterized by a total oxygen uptake rate in excess of 100 mg/1/hr, and said aeration is effected with the use of oxygen-enriched gas.

3. The method of treating BOD-containing aqueous waste which comprises aerating a mixed liquor comprising such waste in admixture with activated sludge in an initial liquid treating stage while controlling at least one variable selected from the group consisting of initial stage influent residence time, activated sludge recycle rate, and initial stage MLVSS concentration to maintain a high ratio of food to biomass and a dissolved oxygen content in the mixed liquor of such initial stage numerically equal in parts per million to at least 2 or one-tenth the numerical value of the ratio F$_s$/M$_a$, whichever is the greater, thereby promoting selective production and growth of dense, rapid-settling microorganisms and thereafter transferring the so-aerated mixed liquor to at least one additional stage of aeration to substantially complete the oxidation and assimilation of remaining BOD values; said high ratio of food to biomass in said initial stage being at least equal to a value expressed by the ratio F$_s$/M$_a$ wherein F$_s$ is equal to 1.5 times the weight of soluble BOD$_5$ charged per day to said initial aeration stage and M$_a$ is equal to the weight of MLVSS in said stage times the coefficient $\alpha$, $\alpha$ being the ratio of the oxygen uptake rate of the MLVSS present in said mixed liquor divided by the reference maximum specific oxygen uptake rate MSOUR at the treating temperature, MSOUR being determined by the equation:

$$\ln \text{MSOUR} = 33.92 - 8640/T(°K).$$

4. The method in accordance with claim 3 wherein the ratio F$_s$/M$_a$ in said initial liquid treating stage is at least 8.

5. The method in accordance with claim 4 wherein said aeration is effected by use of an aeration gas having an oxygen content in excess of 21% by volume.

* * * * *

UNITED STATES PATENT AND TRADEMARK OFFICE
CERTIFICATE OF CORRECTION

PATENT NO. : 3,864,246
DATED : February 4, 1975
INVENTOR(S) : Jeremiah P. Casey; Curtis S. McDowell;
Marshall L. Spector and Alan J. Zupko It is certified that error appears in the above-identified patent and that said Letters Patent are hereby corrected as shown below:

In column 3, line 53, "commoly" should read -- commonly --.

In column 4, line 36, after "specific" insert -- oxygen --.

In column 12, line 16, "MSOUOR" should read -- MSOUR --.

In the twelfth column of Table 1, below the heading 400 and 5.7:
" 1.80 " should read -- 1.68 -- .

In Table 5, lines 7 and 9 below the table heading (each occurrence)
"Nominal Residence Time" should read
-- Influent Detention Time --;

Signed and Sealed this

First Day of March 1977

[SEAL]

Attest:

RUTH C. MASON
Attesting Officer

C. MARSHALL DANN
Commissioner of Patents and Trademarks